United States Patent
Katayama (10) Patent No.: US 6,567,508 B2
(45) Date of Patent: *May 20, 2003

(54) COMMUNICATION DEVICE

(75) Inventor: Kojiro Katayama, Tokyo (JP)

(73) Assignee: Canon Kabushiki Kaisha, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/092,268

(22) Filed: Jun. 5, 1998

(65) Prior Publication Data

US 2002/0048352 A1 Apr. 25, 2002

(30) Foreign Application Priority Data

Jun. 18, 1997 (JP) ............................... 9-161189

(51) Int. Cl.[7] ............................................ H04M 11/00
(52) U.S. Cl. ............................. 379/93.23; 379/93.24; 379/211.02; 379/198
(58) Field of Search ...................... 379/90.01, 93.24, 379/93.23, 265, 267, 210, 211, 198

(56) References Cited

U.S. PATENT DOCUMENTS

| | | | | |
|---|---|---|---|---|
| 5,008,930 A | * | 4/1991 | Gawrys et al. | 379/93.23 |
| 5,228,073 A | * | 7/1993 | Smith | 379/142.01 |
| 5,586,172 A | | 12/1996 | Sakurai et al. | 379/67 |
| 5,619,557 A | * | 4/1997 | Van Berkum | 379/265 |
| 5,649,004 A | * | 7/1997 | Ikeno et al. | 379/212 |
| 5,907,611 A | * | 5/1999 | Dezonno et al. | 379/266.1 |
| 6,041,116 A | * | 3/2000 | Meyers | 379/264 |

FOREIGN PATENT DOCUMENTS

| | | | | |
|---|---|---|---|---|
| GB | 2185363 A | * | 7/1987 | H04M/3/50 |
| JP | 360254958 A | * | 12/1985 | H04M/3/42 |
| JP | 02-058463 | | 2/1990 | |
| JP | 403237860 A | * | 10/1991 | H04M/3/50 |
| JP | 06-338948 | | 12/1994 | |
| JP | 409046503 A | * | 2/1997 | H04M/1/32 |

* cited by examiner

Primary Examiner—Melur Ramakrishnaiah
(74) Attorney, Agent, or Firm—Fitzpatrick, Cella, Harper & Scinto (57) ABSTRACT

When a telephone call is received via an internal line, an information control/storage device transmits an electronic mail to a terminal device via an information line. The electronic mail includes information about the caller of the telephone call. When a user of the internal line cannot respond to a telephone call, an electronic mail is transmitted to a user designated as a substitute answerer. In this case, the electronic mail includes information indicating the user to whom the telephone call is originally addressed. After completion of the response to the telephone call, the substitute answerer transmits a message by an electronic mail to a terminal device of the user to whom the telephone call was originally addressed.

31 Claims, 9 Drawing Sheets

COMMUNICATION DEVICE

BACKGROUND OF THE INVENTION

1. Field of the Invention

The present invention relates to a transmission device for transmitting particular information to a terminal device that is connected to the transmission device via an information line.

2. Description of the Related Art

The inventors of the present invention have proposed a communication system having the capability, as disclosed in Japanese Unexamined Patent Publication No. 2-58463, to display information about a caller on the screen of a telephone device when the telephone device receives a telephone call.

However, a problem with this communication system is that it is not easy to read the information about the caller displayed on the display device of the telephone device because the size of the display device is generally small.

The inventors of the present invention have also proposed telephone exchange apparatus having voice mail capability, disclosed in U.S. Pat. No. 5,586,172, and in Japanese Unexamined Patent Publication No. 6-338948. The telephone exchange apparatus disclosed in U.S. Pat. No. 5,586,172 has the capability to display information on a telephone device to indicate that there is a voice mail addressed to the telephone device.

In the telephone exchange apparatus disclosed in Japanese Unexamined Patent Publication No. 6-338948, the telephone number of the person who has produced the voice message is indicated when the voice message is reproduced.

However, the problem with using a voice mail is that a user often does not notice the indication of the arrival of the voice mail because the indication is displayed on a small-sized display device provided on a telephone device.

Another problem is that the user cannot know the contents of voice mails until they are reproduced, and due to the reproduction time, it takes a long time to know the contents of the voice mails. In particular, this problem becomes serious when there are a large number of voice mails.

SUMMARY OF THE INVENTION

It is an object of the present invention to provide a technique for displaying information useful for a user to answer an incoming call in such a manner that the user can easily read it.

It is another object of the present invention to provide a technique that makes it possible for a substitute answerer to properly answer an incoming call when a user to whom the incoming call is addressed cannot answer the call.

It is still another object of the present invention to provide a quick and highly reliable technique that makes it possible for a user to be informed of the arrival of a message and its contents.

It is still another object of the present invention to provide a technique for answering an incoming call using a personal computer in a highly effective fashion in which the advantages of the personal computer are utilized.

It is still another object of the present invention to provide a high-flexibility apparatus connected to an internal line of a private branch exchange that is capable of providing information useful for a user at another extension device other than the originally called extension device to properly answer an incoming call.

It is still another object of the present invention to provide an apparatus capable of determining the status of the internal line to which an incoming call is addressed, and transmitting an electronic mail including useful information depending on the status of the internal line.

These and other objects and features will become more apparent from the following detailed description of the preferred embodiments.

DESCRIPTION OF THE PREFERRED EMBODIMENTS

Figure 1:
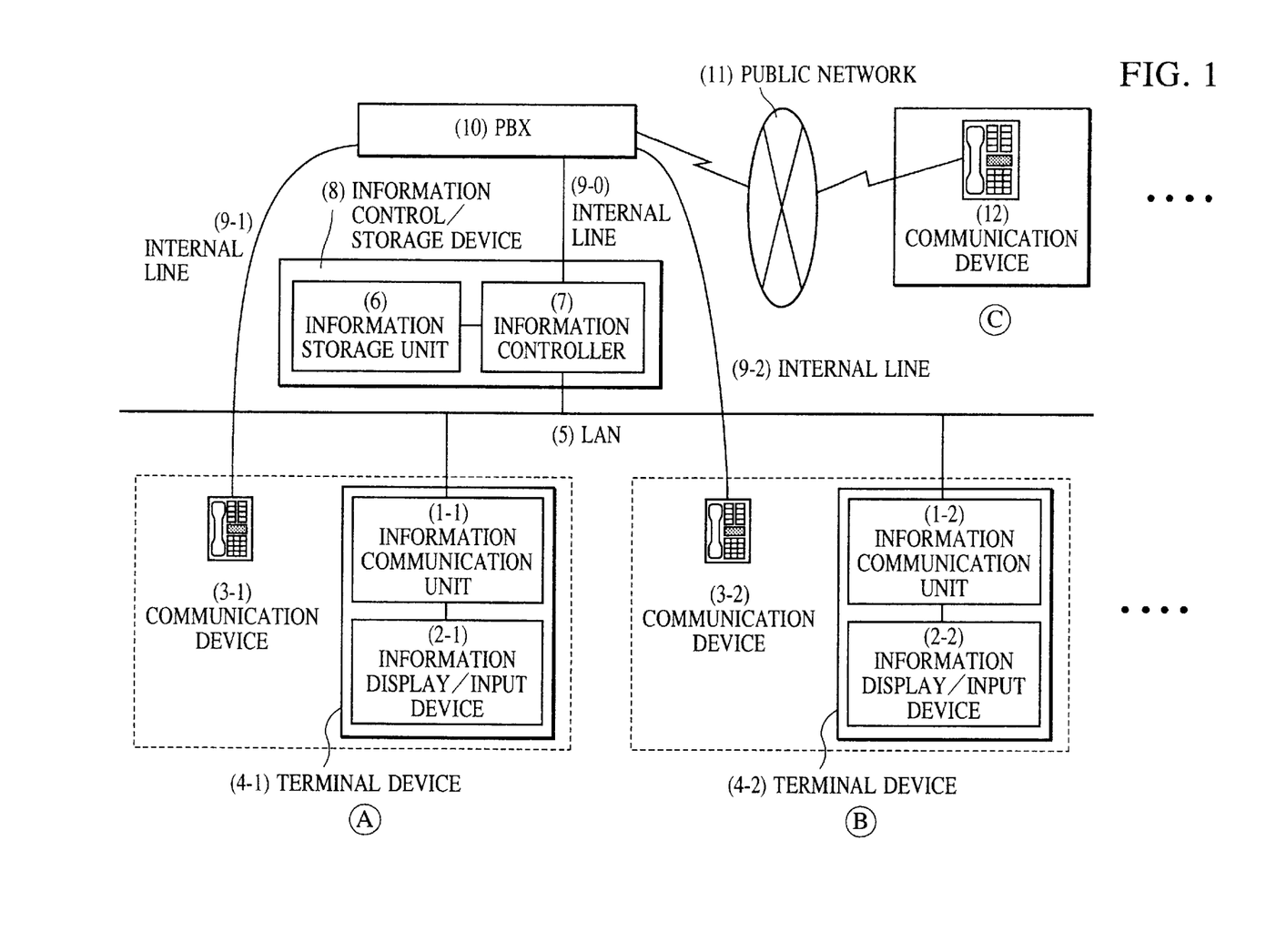
FIG. 1 is a block diagram illustrating an embodiment of the invention.

FIG. 1 is a block diagram illustrating an embodiment of the present invention. As shown in FIG. 1, the system includes information communication units (1-1) to (1-n), information display/input devices (2-1) to (2-n), communication devices (devices having the communication capability, such as telephone devices) (3-1) to (3-n), terminal devices (4-1) to (4-n), an information line (such as an Ethernet local area network (LAN)) (5), an information storage unit (6), an information controller (7), an information control/storage device (8), internal lines (9-0) to (9-n), a private branch exchange (10), a public network (11), and a communication device (device having the communication capability, such as a telephone device) (12).

The information control/storage device (8) is a transmission device for transmitting an electronic mail including substitute answer information for use in answering a telephone call. The substitute answer information will be described in detail later. The information control/storage device (8) is a computer comprising an internal line interface via which a signal is transmitted and received over the internal line (9-0), a LAN interface via which a signal is transmitted and received over the information line (5), a memory for storing a program and a database which will be described later, and a CPU.

The communication devices (3-1) to (3-n) are internal line terminal devices functioning as a telephone and connected to the internal lines (9-1) to (9-n), respectively, of the private branch exchange (10). The terminal devices (4-1) to (4-n) are personal computers connected to an information line such as a LAN (5). The internal line (9-0) is used to transmit analog signals between the information control/storage device (8) and the private branch exchange. The internal lines (9-1) to (9-n) are used to transmit analog signals between the private branch exchange and the communication devices (3-1) to (3-n). On the other hand, the information line (5) is used to transmit digital signals. The connection via the internal lines (9-0) to (9-n) is performed using an analog procedure with a dialing signal and a ringing signal. In contrast, the connection via the information line (5) is performed in accordance with a digital protocol selected from the various protocols defined in the LAN standards. The terminal devices (4-1) to (4-n) are used to perform communication via the information line (5) but they are not used in communication via the private branch exchange (10).

When the communication device (3-2) responds to an incoming telephone call, the information control/storage device (8) transmits predetermined information to the address in terms of the information line (5) assigned to the terminal device (4-2) corresponding to the communication device (3-2). In the case where the information control/storage device (8) first responds to a telephone call from the communication device (12) and the telephone call is then transferred to the communication device (3-2) using the transfer capability of the private branch exchange (10), the above-described predetermined information is transmitted to the terminal device (4-2) when the information control/storage device (8) transmits, to the private branch exchange (10), a dialing signal representing the internal line number of the communication device (3-2).

If the communication device (12) can be identified, the predetermined information transmitted to the terminal device (4-2) may include information about the communication device (12) so that the user B of the terminal device (4-2) can respond to the telephone call in a more proper fashion by referring to that information.

When the communication device (12) makes a call with the intention of communicating with the communication device (3-1), if the call is transferred to the communication device (3-2) instead of the communication device (3-1) because the user of the communication device (3-1) cannot respond to the call, the above-described predetermined information may include information indicating that the telephone call transferred to the communication device (3-2) is originally addressed to the communication device (3-1). In this case, the information control/storage device (8) is informed which communication device the communication device (12) desires to communicate with.

Figure 2:
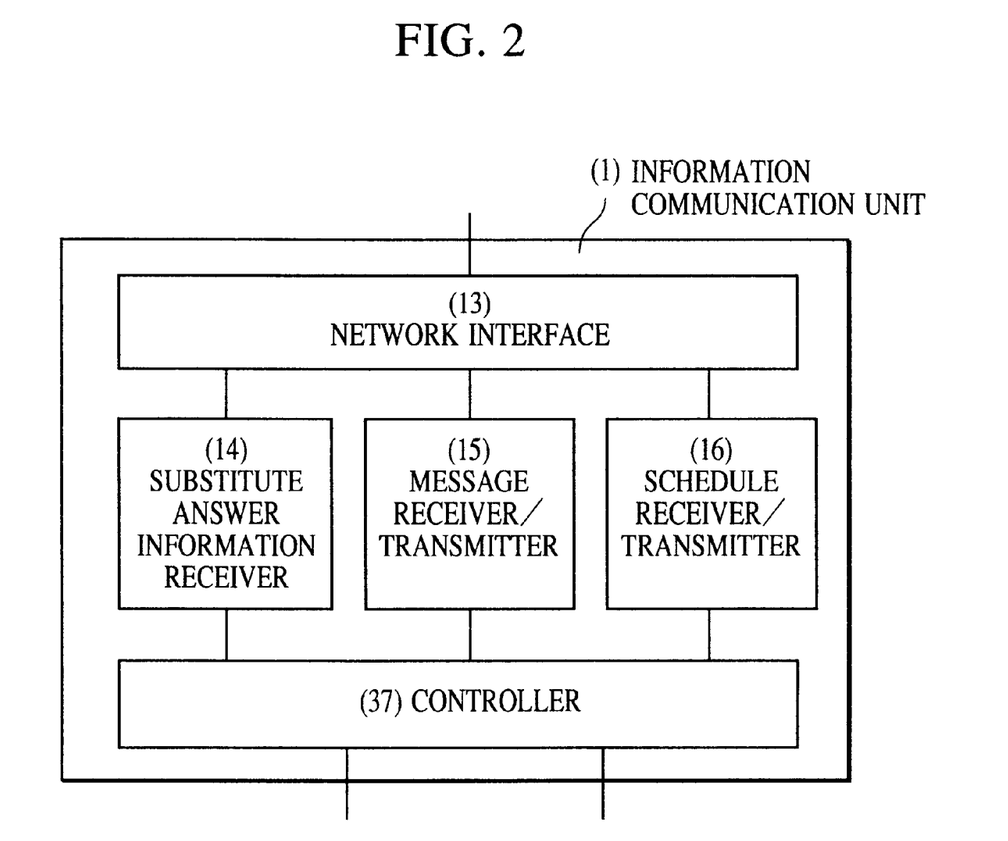
FIG. 2 is a block diagram illustrating the details of the information communication unit (1) shown in FIG. 1.

FIG. 2 is a block diagram illustrating the details of the information communication units (1-1) to (1-n) shown in FIG. 1. As shown, the information communication unit includes a network interface (13) through which signals are transmitted and received over the information line (5), a substitute answer information receiver (14), a message receiver/transmitter (15), a schedule receiver/transmitter (16), and a controller (37). Each information communication unit (1-1) to (1-n) comprises, for example, a personal computer LAN interface, a CPU, and a memory.

Figure 3:
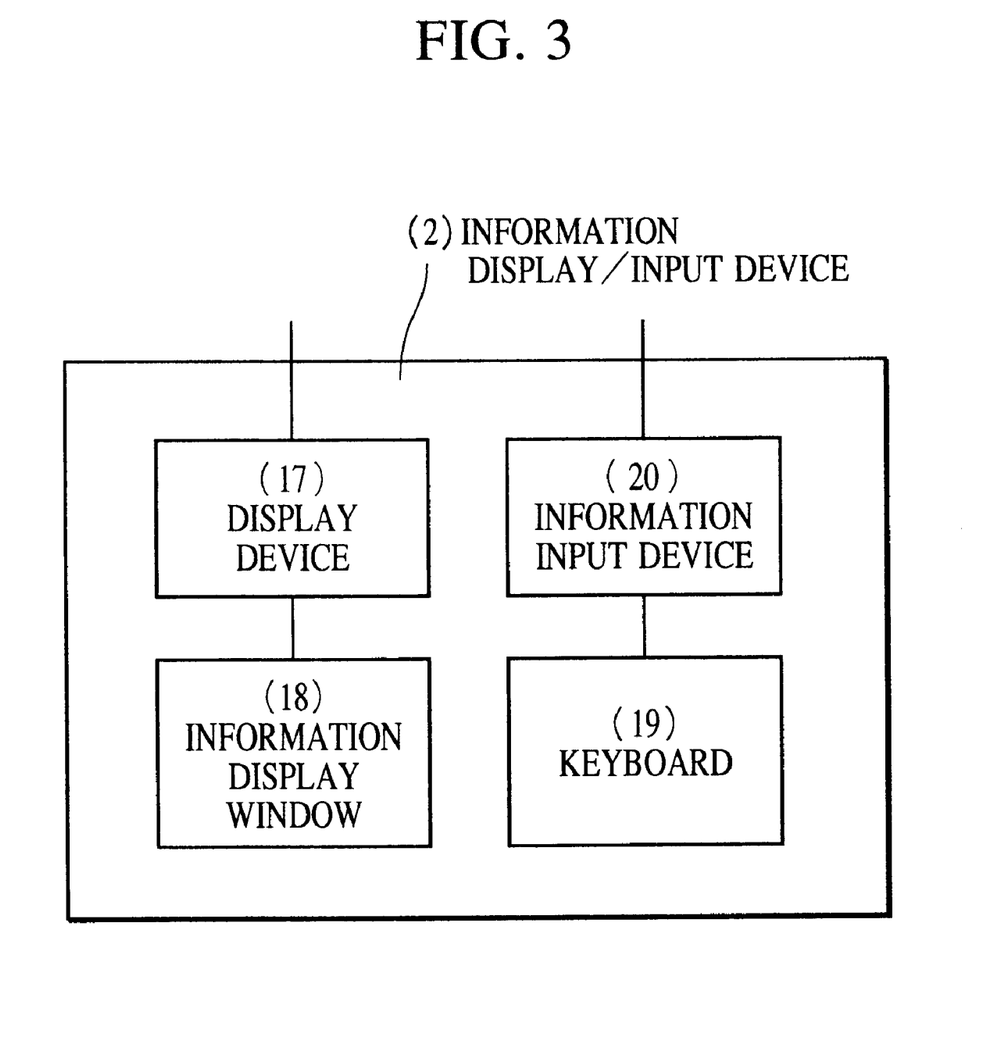
FIG. 3 is a block diagram illustrating the details of the information display/input device (2) shown in FIG. 1.

FIG. 3 is a block diagram illustrating the details of the information display/input devices (2-1) to (2-n) shown in FIG. 1. As shown in FIG. 3, each information display/input device includes a display device (17), an information display window (18), a keyboard (19) and an information input device (20). More specifically, each information display/input device (2-1) to (2-n) may comprise a display and a keyboard used in conjunction with a personal computer.

Figure 4:
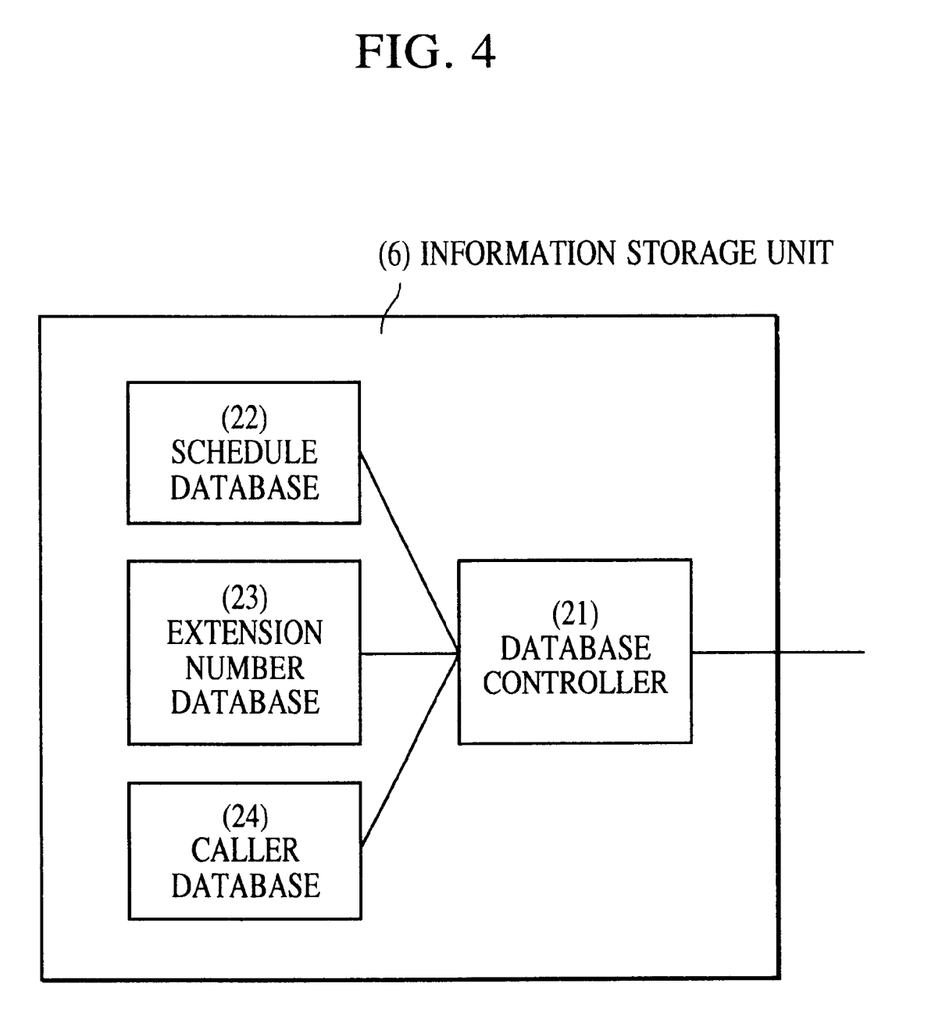
FIG. 4 is a block diagram illustrating the details of the information storage unit (6) shown in FIG. 1.

FIG. 4 is a block diagram illustrating the details of the information storage unit (6) shown in FIG. 1. As shown in FIG. 4, the information storage unit comprises a database controller (21), a schedule database (22), an extension number database (23), and a caller database (24) including information about the names of callers in relation to their telephone numbers.

The schedule database (22) includes information representing whether the users A to N of the communication devices (3-1) to (3-n), respectively, are present or absent. If some of the users are absent, information indicating the substitute answerers for them is stored in the schedule database (22). Furthermore, the schedule database (22) includes the information regarding the mail addresses in terms of the information line (5) assigned to the terminal devices corresponding to the internal line numbers of the respective users and substitute answerers.

Figure 5:
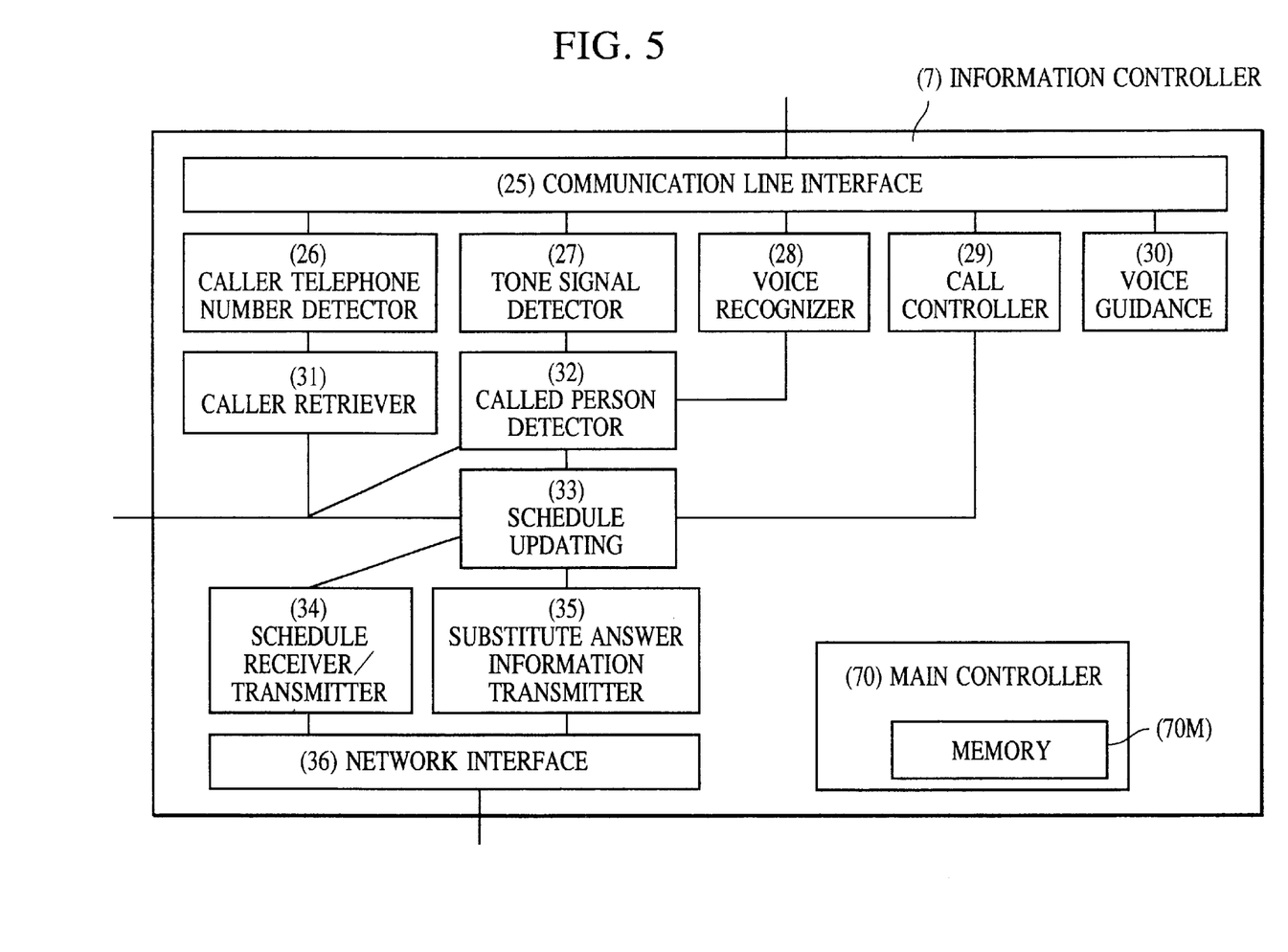
FIG. 5 is a block diagram illustrating the details of the information controller (7) shown in FIG. 1.

FIG. 5 is a block diagram illustrating the details of the information controller (7) shown in FIG. 1. As shown in FIG. 5, the information controller (7) comprises a communication line interface (25) through which the information controller (7) communicates with the private branch exchange (10) via the internal line (9), a caller telephone number detector (26), a tone signal detector (27), a voice recognizer (28), a call controller (29), a voice guidance unit (30), a caller retriever (31), a called person detector (32), a schedule retrieve/update unit (33), a schedule receiver/transmitter (34), a substitute answer information transmitter (35), a network interface (36) through which the information controller communicates with the terminal devices (4-1) to (4-n) via the information line (5), and a main controller (70) including a memory (70M), that is responsible for the control over the entire information controller (7).

The caller telephone number detector (26) detects, via the public network (11), the telephone number of a caller. The tone signal detector (27) detects a PB signal, a ring back tone, and a busy tone coming over the internal line (9). The call controller (29) detects the arrival of a call coming over the internal line (9) and transmits a dialing signal over the internal line (9). Under the control of the main controller (70), the substitute answer information transmitter (35) generates substitute answer information and transmits it over the information line (5).

Figure 6:
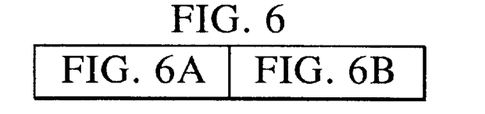
FIG. 6 consisting of FIGS. 6A and 6B, is a schematic representation of the operation of the embodiment of the invention.
Figure 6A:
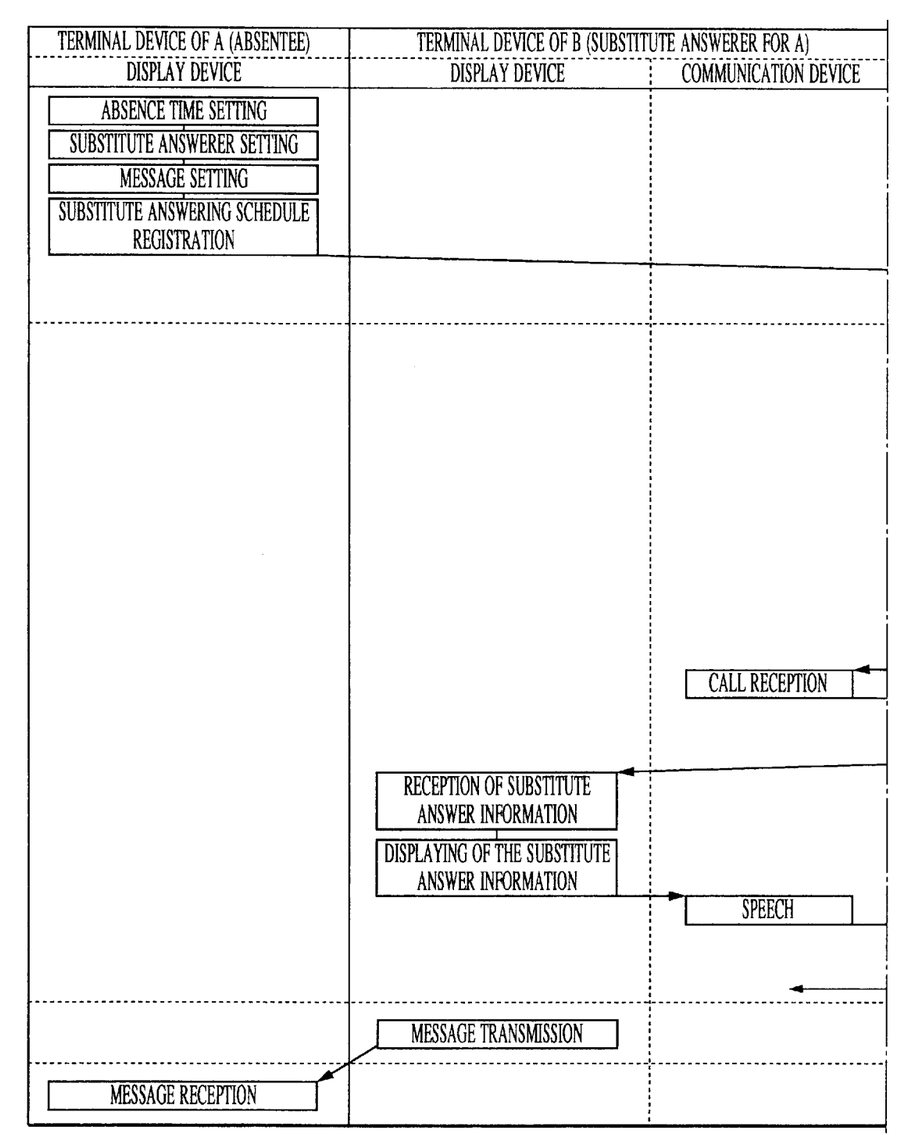
Figure 6B:
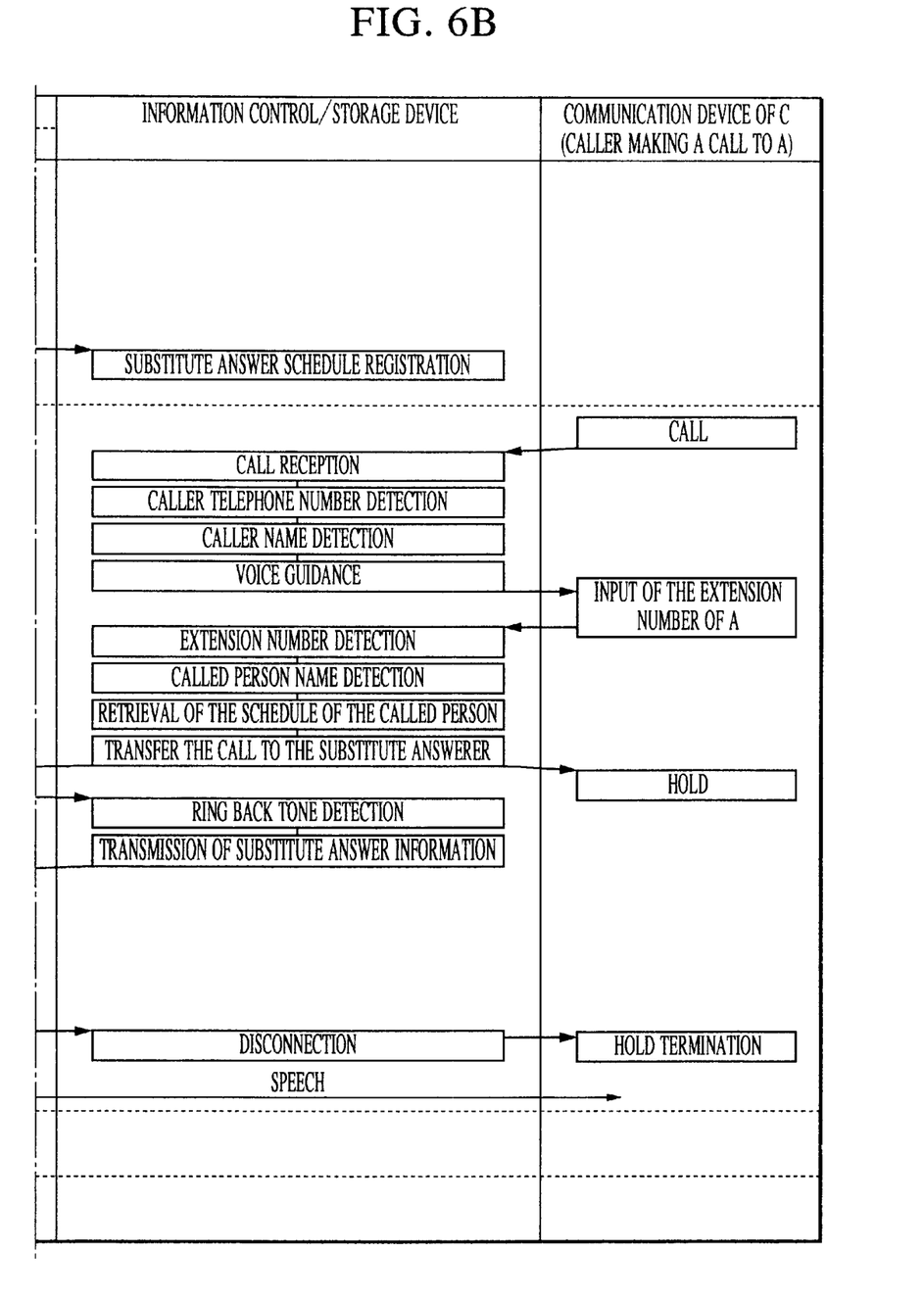

FIG. 6 illustrates the operations performed by and among the terminal device (4-1), the terminal device (4-2), the information control/storage device (8), and the communication device (12) according to the present embodiment of the invention.

Figure 7:
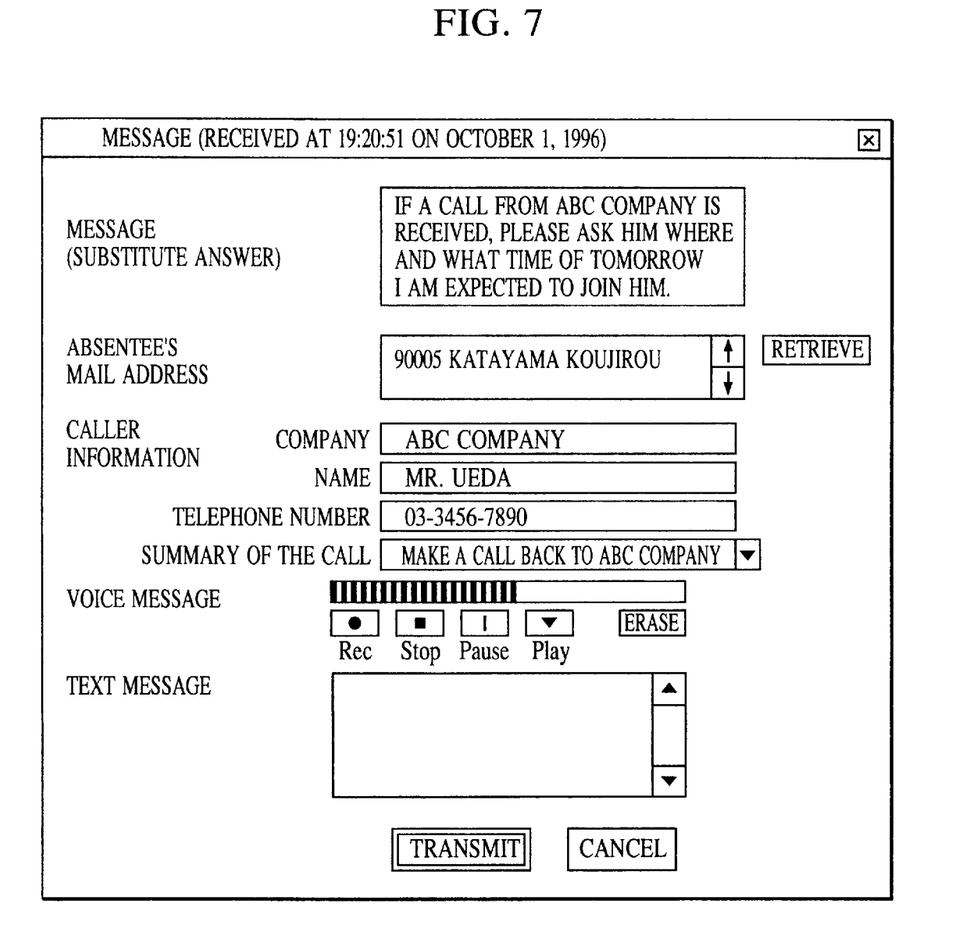
FIG. 7 is a schematic representation of a display window according to the embodiment of the invention.

FIG. 7 illustrates an example of an image displayed in the information display window (18) according to the embodiment of the invention.

Figure 8:
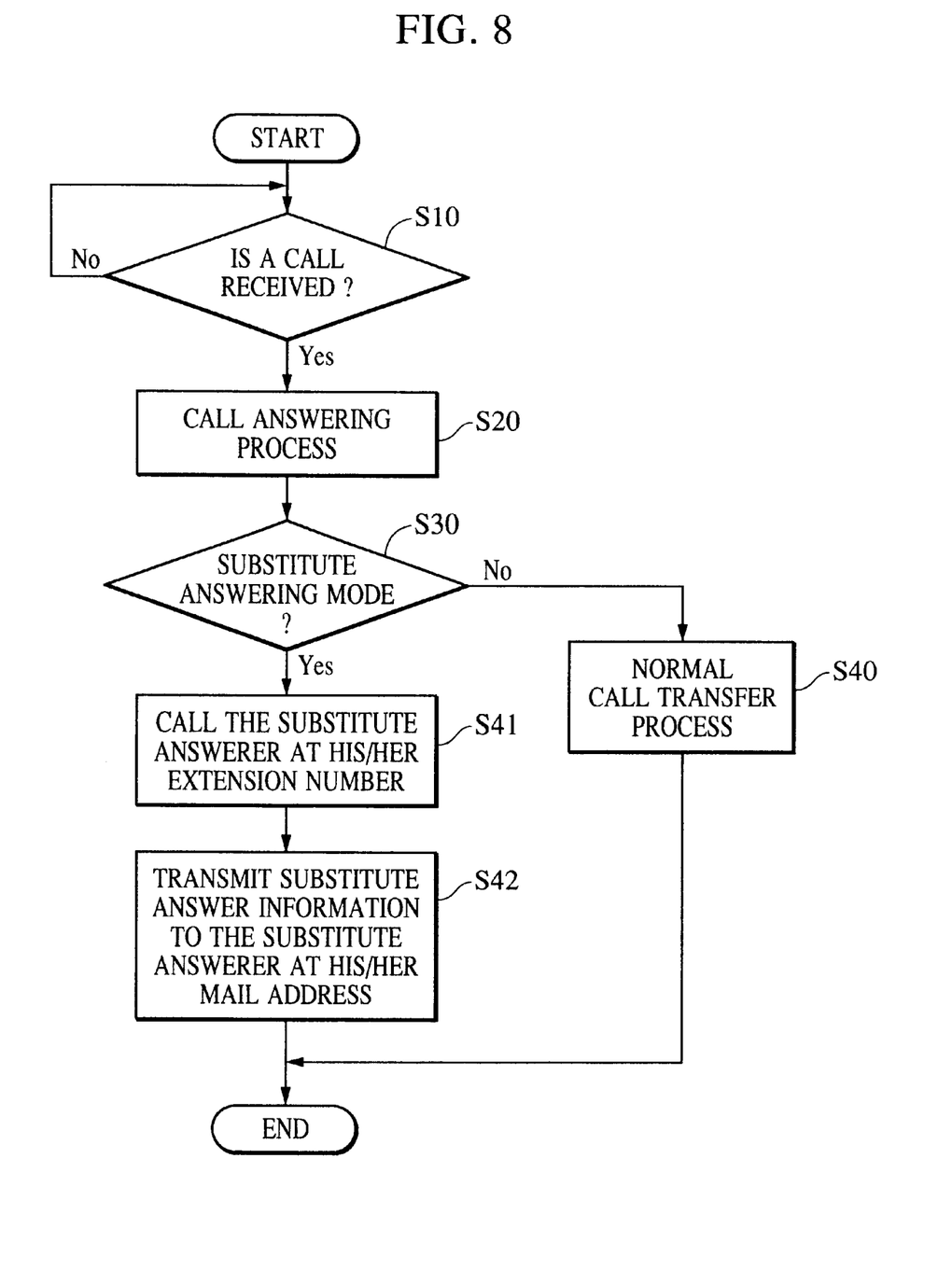
FIG. 8 is a flow chart illustrating the operation according to the embodiment of the invention.

FIG. 8 is a flow chart illustrating the program stored in the memory (70M) and used by the main controller (70) of the information controller (7), according to the embodiment of the invention (70). The program shown in this flow chart may be stored in the memory (70M) during the production process, or stored in it through a disk memory reader (not shown) provided in the information controller (7). Alternatively, the program may be transferred from some of the terminal devices (4-1) to (4-n) to the memory (70M).

FIGS. 1, 2, and 3, elements (1-1) to (1-n), (2-1) to (2-n), and (13) to (20) are similar for any of terminal devices (4-1) to (4-n), although they are denoted by reference numerals such as (1-n), . . . , (20-n).

In the following description, it is assumed that the communication device (3-1) and the terminal device (4-1) are used by a user who is now absent (not at his/her desk), the communication device (3-2) and the terminal device (4-2) are used by a user B designated as a substitute answerer B for the user B, and a user C makes a call from the communication device (12) to the user A who is now absent.

Before leaving his/her desk, the user A inputs the data representing the absence period in which the user A will be absent, the data indicating the substitute answerer for the user A, and a message (to the substitute answerer), through the information input device (20-1) of the terminal device (4-1) thereby storing the substitute answer schedule data into the schedule database (22) via the schedule receiver/transmitter (16-1), the network interface (13-1), the network interface (36), the schedule receiver/transmitter (34), the schedule retrieve/update unit (33), and the database controller (21).

Alternatively, the absence period and the substitute answerer may also be registered by making a call from the communication device (3-1) to the information control/storage device (8) via the internal line (9) and performing an operation in accordance with the voice guidance given by the voice guidance unit (30). The information control/storage device (8) may distinguish whether a call is from the outside or the inside on the basis of the ringing signal pattern.

The schedule database (22) includes the data representing the mail address of the terminal device (4-1) of the absent user A, the telephone number of the communication device (3-2) and the mail address of the terminal device (4-2) of the substitute answerer B, in relation to the telephone number of the communication device (3-1) of the absent user A.

When the private branch exchange (10) receives a telephone call that the user C made to the absent user A, using the dialing circuit of the communication device (12) through the public network (11), the private branch exchange (10) transfers the call to the information control/storage device (8) via the internal line (9-0) in accordance with the predefined program.

In the information control/storage device (8), if the call controller (29) detects the ringing signal received via the line interface (25) from the internal line (9-0) (at step S10), the call controller (29) seizes the internal line (9-0) and responds to the call by performing a call answering process in step S20 as will be described later. If the information control/storage device (8) responds to the call, the private branch exchange (10) connects the information control/storage device (8) to the public network (11) through which the private branch exchange (10) is connected to the communication device (12), so that the information control/storage device (8) is connected to the communication device (12).

On receipt of a telephone call, the information control/storage device (8) detects the telephone number of the communication device (12) via the caller telephone number detector (26). The caller retriever (31) retrieves the name of the caller from the caller database (24) via the database controller (21) using the telephone number as a key. Thus, it turns out that the telephone call is from the user C. The information control/storage device (8) transmits a voice guidance telling "Please input the extension number you wish to be connected to" from the voice guidance unit (30) to the communication device (12) through the internal line (9-0), the private branch exchange (10), and the public network (11).

The caller telephone number detector (26) acquires the telephone number of the communication device (12) using the capability of the public network (11) to provide the information about the telephone number. That is, when the private branch exchange (10) receives the information about the caller's telephone number from the public network (11), the private branch exchange (10) immediately transfers the telephone number of the caller to the information control/storage device (8) via the internal line (9-0) so that the caller telephone number detector (26) can detect the telephone number of the caller.

In accordance with the guidance, the user C inputs the extension number of the user A by means of voice or by pressing buttons of the communication device (12) thereby generating a tone signal. The information control/storage device (8) detects the extension number via the tone signal detector (27) when the extension number is input in the form of a tone signal or via the voice recognizer (28) when the extension number is given in the form of a voice signal. The information control/storage device (8) retrieves the called user by searching the extension number database (23) using the detected extension number as a key via the called person detector and the database controller (21). Thus, the information control/storage device (8) concludes that the received call is to the user A.

In the case where ISDN is employed as the public network (11), the extension number of the called user may be included as the subaddress in the setup message. In this case, because the called person can be identified by means of the service provided by the public network (11), the user C is not required to input the extension number of user A after the communication device (12) is connected to the information control/storage device (8).

In step S30, after obtaining the conclusion that the telephone call is to the user A, the information control/storage device (8) retrieves the schedule of the user A from the schedule database (22) via the schedule retrieve/update unit (33) and the database controller (21). Thus it turns out, in this specific example, that the user A is absent and the user B is designated as the substitute answerer. More specifically, the database controller (21) compares the current time indicated by an internal clock with the absence period stored in the schedule database (22), and concludes, in this example, that the user A is now absent. Furthermore, the database controller (21) learns that the user B is designated as the substitute answerer.

Alternatively, the user A may input data into the schedule database (22) that simply indicates that the user A is absent and that the user B is designated as the substitute answerer. In this case, the user A is regarded as absent and any telephone call to the user A is transferred to the user B until the user A inputs data, via the terminal device (4-1) into the schedule database (22), indicating that the user A is now at his/her desk.

The information control/storage device (8) transfers, by means of using the call controller (29), the telephone call from the user C to the communication device (3-2) of the user B via the line interface (25), the internal line (9-0), and the private branch exchange (10). That is, in step S41, the call controller (29) of the information control/storage device (8) transmits a dialing signal, corresponding to the extension number of the user B who is registered in the schedule database (22) as the substitute answerer for the user A, to the private branch exchange (10) via the internal line (9-0).

During the above operation, the telephone call from the communication device (12) of the user C is held by the private branch exchange (10).

If the tone signal detector (27) of the information control/storage device (8) detects a ring back tone transmitted from the private branch exchange (10), then the substitute answer information transmitter (35) transmits substitute answer information to the display device (17-2) via the network interface (36), the information line (5), the network interface (13-2), and the substitute answer information receiver (14-2)

thereby displaying the substitute answer information in the information display window (18-2).

This substitute answer information is also used by the user B to produce a message to the user A.

Before lifting the handset when the telephone rings, the user B is alerted that the telephone call is from the user C to the user A and that the user B is expected to respond to the call for the user A by viewing the information displayed in the window. The user B can also read the message from the absent user A.

FIG. 7 shows an example of the substitute answer information displayed in the information display window (18-2) of the display device of the user B. As shown in FIG. 7, the message (saying "If a telephone call is received from ABC Company, please ask where and what time tomorrow I am expected to join Mr. C"), the mail address of the absent user A, the name of the caller, and the telephone number of the caller are automatically displayed in the information display window. A simple-form message may be produced by selecting the appropriate message from four sentences, "Call back", "Call back as soon as possible", "There was a call to you", and "Caller will call you again". A complete message can be easily produced by combining this simple-form report message with the information automatically displayed in the information display window. If there is something more to be added to the simple-form report message, information may be added either in the form of a text or voice.

If the transmit button is clicked, the substitute answer information including the message is transmitted to the user A by transmitting to the mail address of the terminal device (4-1) on the information line (5) via the message receiver/transmitter (15-2) and the network interface (13-2).

More specifically, in step S42, the substitute answer information transmitter (35) of the information control/storage device (8) produces the substitute answer information including the message, the mail address of the absent user, the name of the caller, the telephone number of the caller, and the simple-form report message, and transmits it together with the address information, including the electronic mail address of the terminal device (4-2) of the substitute answerer, on the information line (5), wherein the mail address of the terminal device (4-2) of the substitute answerer is also stored, in relation to the user A, in the schedule database (22).

In the above operation, the message is stored in the schedule database (22) as the message from A to B. The electronic mail address of the absent user is stored, in relation to the schedule of the user A, in the schedule database (22). The telephone number of the user C, detected by the caller telephone number detector (26), is employed as the telephone number of the caller. The name of the user C, obtained by searching the caller database (24) using the telephone number of the user C as a key, is employed as the name of the caller. The four sentences used to produce the simple-form report message are stored in the substitute answer information transmitter (35). The substitute answer information transmitter (35) combines these pieces of information and transmits the combined information as the substitute answer information. In the present embodiment, the information controller (7) produces the substitute answer information so that when the substitute answerer clicks the transmit button, the substitute answer information is transmitted by an electronic mail to the mail address of the absent user via the information line (5).

In the case where the user A registers no message in the schedule database (22), the substitute answer information includes no message. When the telephone number of the caller is not detected, the substitute answer information does not include the telephone number of the caller. The sentences used to produce the simple-form report message may be set by users as required.

If the substitute answerer B responds via the communication device (3-2), the tone signal detector (27) of the information control/storage device (8) detects elimination of the ring back tone, and the call controller (29) disconnects the seized internal line (9-0). After the disconnection of the internal line (9-0), the private branch exchange (10) releases, from the held state, the telephone call from the communication device (12) and connects the communication device (12) to the communication device (3-2). Thus, the user C is connected to the substitute answerer B.

In the case where the substitute answerer B has transmitted the substitute answer information from the terminal device (4-2) to the terminal device (4-1), the user A can see, after coming back to his/her desk, the message from the user B included in the substitute answer information received via the network interface (13-1) and the message receiver/transmitter (15-1) of the terminal device (4-1) as displayed in the information display window (18-1).

When the telephone call from C is transferred to B, if the tone signal detector (27) cannot detect the ring back tone, but instead detects a busy tone, the telephone call from C is transferred to another communication device (3-3) instead of being transferred to B. In this case, the substitute answer information is transmitted to the terminal device (4-3).

If the user A is present at his/her desk, the information control/storage device (8) transfers the received telephone call to the communication device (3-1). In this case the substitute answer information is not transmitted.

The user A who is going to leave his/her desk may store his/her schedule data in the schedule database (22), designating a group as a substitute answering group, so that a member of the group can respond to an incoming telephone call when the primary substitute answerer cannot respond to the call.

When some group is designated as the substitute answering group, if the primary substitute answerer cannot respond to a call because he/she is not at his/her desk, or because his/her telephone is busy, the call controller (29) transfers the telephone call to some of the communication devices of the substitute answering group.

In this case, the substitute answer information transmitter (35) transmits an electronic mail to the terminal device corresponding to the communication device of the substitute answering group to which the telephone call is transferred.

In the specific embodiment described above, the information control/storage device (8) connected to the internal line (7) of the private branch exchange (10) transmits an electronic mail to the terminal device (4-2) via the information line (5), so that the user of the communication device (3-2) can learn who is calling. In the case where a telephone from the communication device (12) to the communication device (3-1) is transferred to the communication device (3-2), the information control/storage device (8) first responds to the call before transferring it, transmitting an electronic mail to the terminal device (4-2) so as to inform the substitute answerer that the telephone call addressed to the communication device (3-1) is being transferred to the communication device (3-2), and also to provide information regarding the identification information, such as a name, of the communication device (12). The above-described electronic mail also includes the information about the address of the terminal device (4-1) so that the substitute answerer can easily transmit a message by an electronic mail from the terminal device (4-2) to the terminal device (4-1).

However, the present invention is not limited to the details described in the above embodiment.

That is, instead of employing the information control/storage device connected to the private branch exchange (10) via the internal line, the information control/storage device may be located inside the private branch exchange (10).

In this case, when the private branch exchange (10) receives a telephone call from the public network (11), the information control/storage device (8) located inside the private branch exchange (10) transmits substitute answer information by an electronic mail to the terminal device of a substitute answerer via the information line (5) connected to the information control/storage device (8).

Furthermore, when the communication device (3-2) is ringing, if the communication device (3-3) is dialed to a predetermined number, the private branch exchange (10) may transmit substitute answer information by an electronic mail to the terminal device (4-3) corresponding to the communication device (3-3). In this case, the controller of the private branch exchange (10) informs the information control/storage device (8) located in the private branch exchange (10) that the communication device (3-3) is dialed to a particular number designated as the substitute answering number. In response, the information control/storage device (8) retrieves the electronic mail address corresponding to the communication device (3-3) from the database, and transmits an electronic mail, such as that shown in FIG. 7, to the electronic mail address retrieved.

The extension number of a called person may also be identified by means of the direct inward-dialing capability.

Furthermore, even in a normal operation other than in the substitute answering operation, call information including caller information and a simple-form report massage may be transmitted by an electronic mail to the information line address of a terminal device corresponding to a communication device having an incoming call. That is, in the normal call transfer process in step S40 shown in FIG. 8, an electronic mail may be transferred to the terminal device (4-1).

The communication device (3-1) and the terminal device (4-n), . . . , and the communication device (3-n) and the terminal device (4-n) may exist either separately, or in a fashion where a handset is provided on a personal computer.

Although the present invention has been described above with reference to specific embodiments, the invention is not limited to those embodiments. Various modifications are possible within the scope of the invention defined by the appended claims.

What is claimed is:

1. A transmission device comprising:
    detecting means for detecting an incoming call; and
    transmission means for transmitting information destined for a second terminal device in a case where a first communication device in a substitute response mode is designated by a calling party of the incoming call and the incoming call is to be responded to by a second communication device,
    wherein the information includes an electronic mail address of a first terminal device, and
    wherein the first communication device corresponds to the first terminal device, and the second communication device corresponds to the second terminal device.

2. A transmission device according to claim 1, wherein said transmission means transmits the information destined for the second terminal device by electronic mail.

3. A transmission device according to claim 1, wherein said transmission means transmits the information including the electronic mail address of the first terminal device and a message from the first terminal device to the second terminal device.

4. A transmission device according to claim 1, wherein said transmission means transmits the information including the electronic mail address of the first terminal device and a plurality of messages which are selectable by the second terminal device.

5. A transmission device according to claim 1, further comprising scheduling means for scheduling the substitute response mode of the first communication device.

6. A transmission method comprising the steps of:
    detecting an incoming call; and
    transmitting information destined for a second terminal device in a case where a first communication device in a substitute response mode is designated by a calling party of the incoming call and the incoming call is to be responded to by a second communication device,
    wherein the information includes an electronic mail address of a first terminal device, and
    wherein the first communication device corresponds to the first terminal device, and the second communication device corresponds to the second terminal device.

7. A transmission method according to claim 6, wherein the information destined for the second terminal device is transmitted by electronic mail.

8. A transmission method according to claim 6, wherein the information including the electronic mail address of the first terminal device and a message from the first terminal device are transmitted to the second terminal device.

9. A method according to claim 6, further comprising scheduling the substitute response mode of the first communication device.

10. A storage medium storing a program which, when executed by a controller of a transmission device, performs a method comprising the steps of:
    detecting an incoming call; and
    transmitting information destined for a second terminal device in a case where a first communication device in a substitute response mode is designated by a calling party of the incoming call and the incoming call is to be responded to by a second communication device,
    wherein the information includes an electric mail address of a first terminal device, and
    wherein the first communication device corresponds to the first terminal device, and the second communication device corresponds to the second terminal device.

11. A storage medium according to claim 10, wherein the information destined for the second terminal device is transmitted by electronic mail.

12. A storage medium according to claim 10, wherein the information including the electric mail address of the first terminal device and a message from the first terminal device are transmitted to the second terminal device.

13. A storage medium according to claim 10, further comprising scheduling the substitute response mode of the first communication device.

14. A transmission device comprising:
    responding means for responding to an incoming call from the private branch exchange;
    transferring signal transmission means for transmitting a transferring signal to the private branch exchange so that the incoming call from the private branch exchange is transferred to a second communication device by the private branch exchange in a case where a first communication device in a substitute answer mode is designated by a calling party of the incoming call; and substitute response information transmission means for transmitting substitute response information destined for a terminal device corresponding to the second communication device, wherein the substitute response information includes information related to the first communication device.

15. A transmission device according to claim 14, wherein said substitute response information transmission means transmits the electronic mail including the substitute response information.

16. A transmission device according to claim 14, wherein the information related to the first communication device includes an electric mail address of a second terminal device corresponding to the first communication device designated by the calling party.

17. A transmission device according to claim 14, wherein said substitute response information transmission means transmits the substitute response information depending on a signal transmitted by the private branch exchange in response to the transferring signal.

18. A transmission device according to claim 14, wherein the information related to the first communication device includes a message to the terminal device from a second terminal device corresponding to the first communication device.

19. A transmission device according to claim 14, further comprising scheduling means for scheduling the substitute answer mode of the first communication device.

20. A method of transmitting substitute response information comprising the steps of:

responding to an incoming call from the private branch exchange;

transmitting a transferring signal to the private branch exchange so that the incoming call from the private branch exchange is transferred to a second communication device by the private branch exchange in a case where a first communication device in a substitute answer mode is designated by a calling party of the incoming call; and transmitting substitute response information destined for a terminal device corresponding to the second communication device, wherein the substitute response information includes information related to the first communication device.

21. A method according to claim 20, wherein the electronic mail including the substitute response information is transmitted in said substitute response information transmitting step.

22. A method according to claim 20, wherein the information related to the first communication device includes an electronic mail address of a second terminal device corresponding to the first communication device designated by the calling party.

23. A method according to claim 20, wherein the substitute response information is transmitted depending on a signal which is transmitted by the private branch exchange in response to the transferring signal.

24. A method according to claim 20, wherein the information related to the first communication device includes a message to the terminal device from a second terminal device corresponding to the first communication device.

25. A method according to claim 20, further comprising scheduling the substitute answer mode of the first communication device.

26. A storage medium storing a program, which when executed by a controller of a transmission device, performs a method of transmitting substitute response information, comprising the steps of:

responding to an incoming call from the private branch exchange;

transmitting a transferring signal to the private branch exchange so that the incoming call from the private branch exchange is transferred to a second communication device by the private branch exchange in a case where a first communication device in a substitute answer mode is designated by a calling party of the incoming call; and transmitting substitute response information destined for a terminal device corresponding to the second communication device, wherein the substitute response information includes information related to the first communication device.

27. A storage medium according to claim 26, wherein the electronic mail includes the substitute response information transmitted in said substitute response information transmitting step.

28. A storage medium according to claim 26, wherein the information related to the first communication device includes an electronic mail address of a second terminal device corresponding to the first communication device designated by the calling party.

29. A storage medium according to claim 26, wherein the substitute response information is transmitted depending on a signal which is transmitted by the private branch exchange in response to the transferring signal.

30. A storage medium according to claim 26, wherein the information related to the first communication device includes a message to the terminal device from a second terminal device corresponding to the first communication device.

31. A storage medium according to claim 26, further comprising scheduling the substitute answer mode of the first communication device.

* * * * *